United States Patent
Sugawara et al.

(10) Patent No.: US 7,279,242 B2
(45) Date of Patent: Oct. 9, 2007

(54) FUEL CELL SYSTEM

(75) Inventors: Tatsuya Sugawara, Utsunomiya (JP); Kouji Miyano, Utsunomiya (JP); Kuri Kasuya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 621 days.

(21) Appl. No.: 10/691,785

(22) Filed: Oct. 23, 2003

(65) Prior Publication Data
US 2004/0091827 A1  May 13, 2004

(30) Foreign Application Priority Data
Oct. 29, 2002  (JP)  ............ 2002-314148

(51) Int. Cl.
*H01M 8/04* (2006.01)
(52) U.S. Cl. .................. 429/17; 429/34
(58) Field of Classification Search .......... 429/34, 429/12–13, 17
See application file for complete search history.

(56) References Cited

U.S. PATENT DOCUMENTS 6,800,390 B2 * 10/2004 Kashiwagi ............ 429/34
6,815,103 B2 * 11/2004 Abe et al. ............ 429/13
2002/0136942 A1 * 9/2002 Kashiwagi ............ 429/34
2003/0148167 A1 * 8/2003 Sugawara et al. ...... 429/34
2005/0164069 A1 * 7/2005 Margiott et al. ....... 429/38

FOREIGN PATENT DOCUMENTS

| EP | 1416562 | * | 5/2004 |
| JP | 58-030075 | | 2/1983 |
| JP | 07-240220 | | 9/1995 |
| JP | 09-213353 | | 8/1997 |
| JP | 2002-63921 | | 2/2002 |
| JP | 2002-352825 | | 12/2002 |

* cited by examiner

*Primary Examiner*—Mark Ruthkosky
(74) *Attorney, Agent, or Firm*—Fish & Richardson P.C.

(57) ABSTRACT

The present invention is carried out to improve the starting capability of a fuel cell at low temperatures. The fuel cell system comprises a fuel cell 1 which generate electric power by supplying hydrogen gas and a oxidant gas, a hydrogen gas passage 10 for supplying hydrogen to the fuel cell 1, a hydrogen off gas circulation passage 20 for returning the hydrogen off gas to the hydrogen supply flow path 10, a hydrogen pump 7 provided at the hydrogen gas off gas circulation passage 20 for boosting the hydrogen off gas, a hydrogen off gas bypass passage 22 for returning the hydrogen off gas to the hydrogen supply flow path 10, an ejector 6 for sending hydrogen off gas in the hydrogen off gas bypass passage 20 provided in the hydrogen gas supply flow path 10 to the hydrogen supply flow path 10.

5 Claims, 3 Drawing Sheets

FUEL CELL SYSTEM

BACKGROUND OF THE INVENTION

Priority is claimed to Japanese application No. 2002-314148, filed Oct. 29, 2002, which is incorporated herein by reference.

1. Field of the Invention

This invention relates to a fuel cell system for use in fuel cell vehicles and the like.

2. Description of the Related Art

Because fuel cells which generate power by using hydrogen gas and an oxidizing gas as reaction gases produce water as well as power, an even larger consumption amount of hydrogen gas and oxidizing gas than is necessary for power generation is supplied in order to discharge this produced water from inside the fuel cell.

Accordingly, there is non-reacted hydrogen gas contained in the anode off gas discharged from the anode of the fuel cell (hereunder referred to as hydrogen off gas), and since this is emitted in this state, fuel consumption deteriorates. Therefore, in order to improve fuel consumption, a fuel cell system has been devised in which this hydrogen off gas is positively circulated using a device for raising the pressure, such as a hydrogen pump or the like, and mixed with fresh hydrogen gas and again supplied to the fuel cell, as shown, for example, Japanese Unexamined Patent Application, First Application No. 58-30075. Hereunder, a fuel cell system that circulates and reuses fuel in this way will be referred to as a circulation-type fuel cell system.

However, in the case of a solid polymer electrolyte membrane-type fuel cell, because the electrolytic conductivity is reduced and the power output decreases when the solid polymer electrolyte membrane dries out, it is necessary to maintain the solid polymer electrolyte membrane at a predetermined moistness in order to maintain a favorable power generating performance. Therefore, in solid polymer electrolyte membrane-type fuel cells, there are cases in which moistened hydrogen gas is supplied to the fuel cell, as shown, for example, Japanese Unexamined Patent Application, First Application No. 7-240220.

In the case of this fuel cell, the hydrogen off gas discharged from the fuel cell also contains moisture. Because of that, in the circulation-type fuel cell system provided with this solid polymer electrolyte membrane-type fuel cell, the hydrogen off gas containing moisture is circulated by the hydrogen pump or the like.

However, in the above circulation-type fuel cell system provided with this solid polymer electrolyte membrane-type fuel cell, there is concern that when the fuel cell system is stopped in a below-freezing environment, water content within the hydrogen pump freezes, so that it becomes difficult to start the hydrogen pump, and the discharge amount is reduced. When this happens, the amount of circulating hydrogen off gas is reduced when starting up at low temperatures, and as a result, there is concern that the amount of hydrogen supplied to the fuel cell is reduced, thus making stabilized startup of the fuel cell system difficult.

Furthermore, freezing of the hydrogen pump is not limited to the case where moistened hydrogen gas is supplied to the fuel cell, and may also occur in a circulation-type fuel cell system which does not actively moisten the hydrogen gas supplied to the fuel cell. That is because water is produced as well as power in fuel cells similar to the above, and this produced water is discharged together with the hydrogen off gas.

Also, in the case where the hydrogen pump is unable to drive for reasons other than freezing, and the discharge amount is reduced, the same difficulties arise.

SUMMARY OF THE INVENTION

This invention provides a fuel cell system with excellent startup performance at low temperatures, in which hydrogen off gas can be circulated even when the hydrogen pump is unable to drive due to freezing and so on.

To solve the aforementioned problems, a first aspect of the invention is a fuel cell system comprising: a fuel cell (for example the fuel cell 1 in the later mentioned embodiment) which is supplied with hydrogen gas and an oxidizing gas to generate power; a hydrogen gas supply flow path (for example the hydrogen gas supply flow path 10 in the later mentioned embodiment) which supplies hydrogen gas to the fuel cell; a hydrogen off gas circulation path (for example the hydrogen off gas circulation path 20 in the later mentioned embodiment) which returns hydrogen off gas discharged from the fuel cell to the hydrogen gas supply flow path; a hydrogen pump (for example the hydrogen pump 7 in the later mentioned embodiment) provided in the hydrogen off gas circulation path to raise the pressure of the hydrogen off gas; a hydrogen off gas bypass flow path (for example the hydrogen off gas bypass flow path 22 in the later mentioned embodiment) which bypasses the hydrogen pump to return the hydrogen off gas to the hydrogen gas supply flow path; and an ejector (for example the ejector 6 in the later mentioned embodiment) provided in the hydrogen gas supply flow path which feeds hydrogen off gas from the hydrogen off gas bypass flow path to the hydrogen gas supply flow path.

By having such a construction, when the hydrogen pump is driving normally, the hydrogen off gas can be returned to the hydrogen gas supply flow path via the hydrogen off gas circulation path. Moreover, when the amount of circulating hydrogen off gas flowing through the hydrogen off gas circulation path is insufficient due to malfunctioning and so on of the hydrogen pump, the hydrogen off gas can be returned to the hydrogen gas supply flow path via the hydrogen off gas bypass flow path, by the ejector. Therefore the hydrogen off gas can be reliably circulated.

A second aspect of the invention is that in the first aspect of the invention, a reverse flow prevention device (for example the isolation valve 23, or check valve 24 in the later mentioned embodiments) is provided in the hydrogen off gas bypass flow path to prevent reverse flow of the hydrogen off gas.

By having such a construction, when the hydrogen pump is driving normally, the hydrogen off gas which has been raised in pressure by the hydrogen pump can be prevented from flowing through the hydrogen off gas bypass flow path, and the full amount of hydrogen off gas can be circulated.

A third aspect of the invention is that in the first or second aspects of the invention, the hydrogen off gas circulation path and the hydrogen off gas bypass flow path are connected to a suction side of the ejector.

By having such a construction, it becomes possible to simplify the flow path construction.

A fourth aspect of the invention is that in the second or third aspects of the invention, the reverse flow prevention device is an isolation valve (for example the isolation valve 23 in the later mentioned embodiment) which is controlled depending on a driving state of the hydrogen pump.

By having such a construction, by controlling the isolation valve to a closed state when the hydrogen pump is being driven normally, the hydrogen off gas is prevented from flowing through the hydrogen off gas bypass flow path, so that the full amount of hydrogen off gas can be circulated by the hydrogen pump, and by controlling the isolation valve to an open state when the hydrogen pump is malfunctioning or disabled, the hydrogen off gas can be circulated via the hydrogen off gas bypass flow path and the ejector.

A fifth aspect of the invention is that in the fourth aspect of the invention, the isolation valve is controlled to a closed state when a rotation speed of the hydrogen pump exceeds a predetermined rotation speed, and is controlled to an open state when the rotation speed of the hydrogen pump is lower than the predetermined rotation speed.

By having such a construction, by determining that the hydrogen pump is driving normally when the rotation speed of the hydrogen pump exceeds the predetermined rotation speed, and controlling the isolation valve to a closed state, the hydrogen off gas is prevented from flowing through the hydrogen off gas bypass flow path, so that the full amount of hydrogen off gas can be circulated by the hydrogen pump. Also, by determining that the hydrogen pump is malfunctioning or disabled when the rotation speed of the hydrogen pump is lower than the predetermined rotation speed, and controlling the isolation valve to an open state, the hydrogen off gas can be circulated via the hydrogen off gas bypass flow path and the ejector.

A sixth aspect of the invention is that in the second or third aspects of the invention, the reverse flow prevention device is an isolation valve which is controlled to a closed state when an outside air temperature exceeds a predetermined temperature, and is controlled to an open state when the outside air temperature is lower than the predetermined temperature.

By having such a construction, because there is no concern that the hydrogen pump is freezing when the outside air temperature exceeds the predetermined temperature, by controlling the isolation valve to a closed state at this time, the hydrogen off gas is prevented from flowing through the hydrogen off gas bypass flow path, thus enabling the full amount of hydrogen off gas to be circulated by the hydrogen pump. Also, because there is concern that the hydrogen pump may freeze when the outside air temperature is lower than the predetermined temperature, by controlling the isolation valve to an open state at this time, the hydrogen off gas can be circulated via the hydrogen off gas bypass flow path and the ejector.

A seventh aspect of the invention is that in the second or third aspects of the invention, the reverse flow prevention device is a check valve (for example the check valve 24 in the later mentioned embodiment) which allows the hydrogen off gas to flow along the hydrogen off gas bypass flow path in a direction flowing into the ejector, and prevents flow in the reverse direction thereof.

By having such a construction, because the check valve opens and closes by mechanically sensing an increase in the pathway obstruction and suction resistance, when the hydrogen pump is being driven normally, with no electric control, the hydrogen off gas is prevented from flowing through the hydrogen off gas bypass flow path, enabling the full amount of hydrogen off gas to be circulated by the hydrogen pump. Moreover, when the amount of circulating hydrogen off gas flowing through the hydrogen off gas circulation path due to the hydrogen pump malfunctioning (including being disabled) is insufficient, the hydrogen off gas can be circulated via the hydrogen off gas bypass flow path and the ejector.

DETAILED DESCRIPTION OF THE INVENTION

Figure 2:
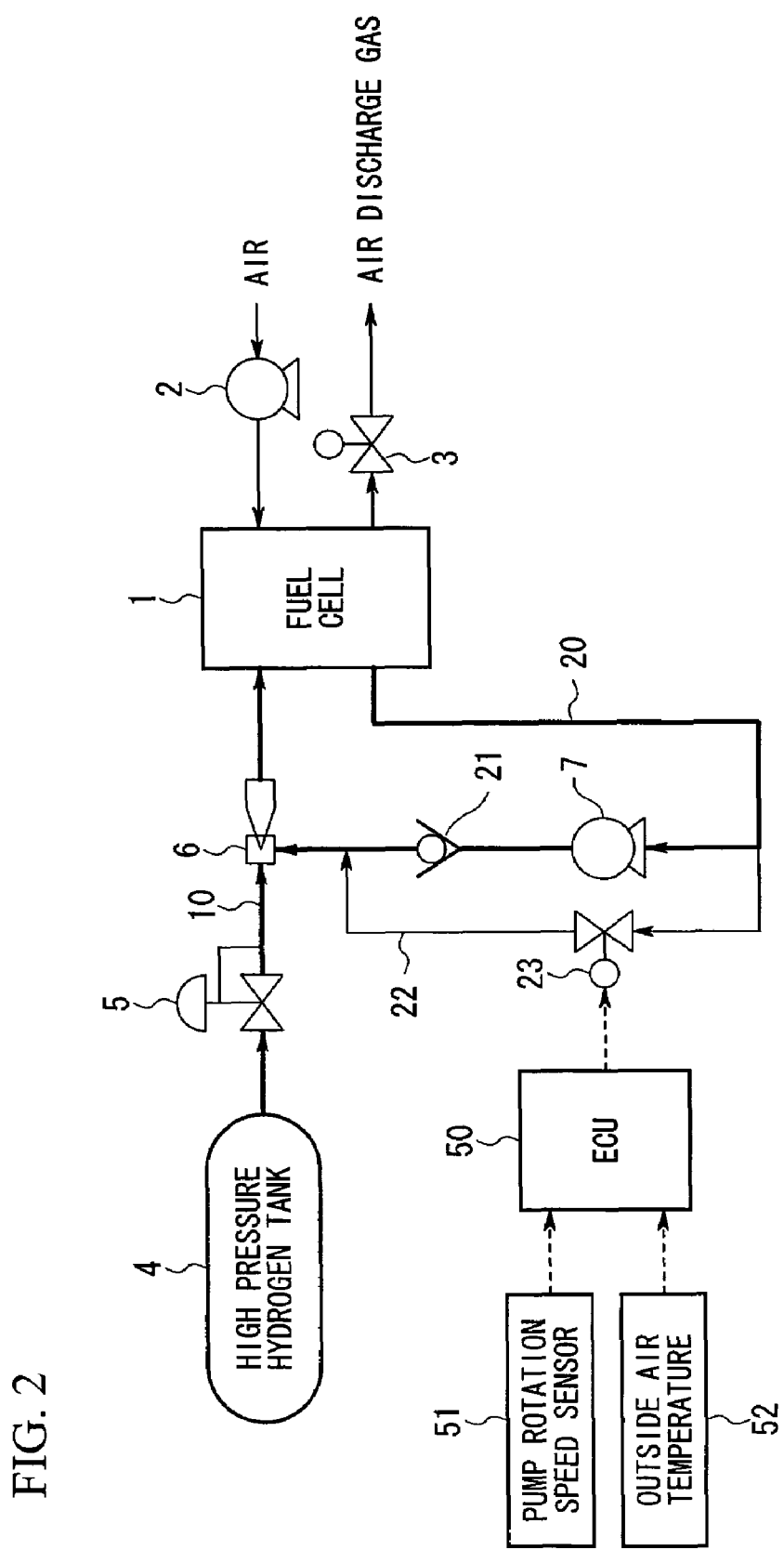
FIG. 2 is a schematic diagram of a second embodiment of a fuel cell system according to this invention.
Figure 3:
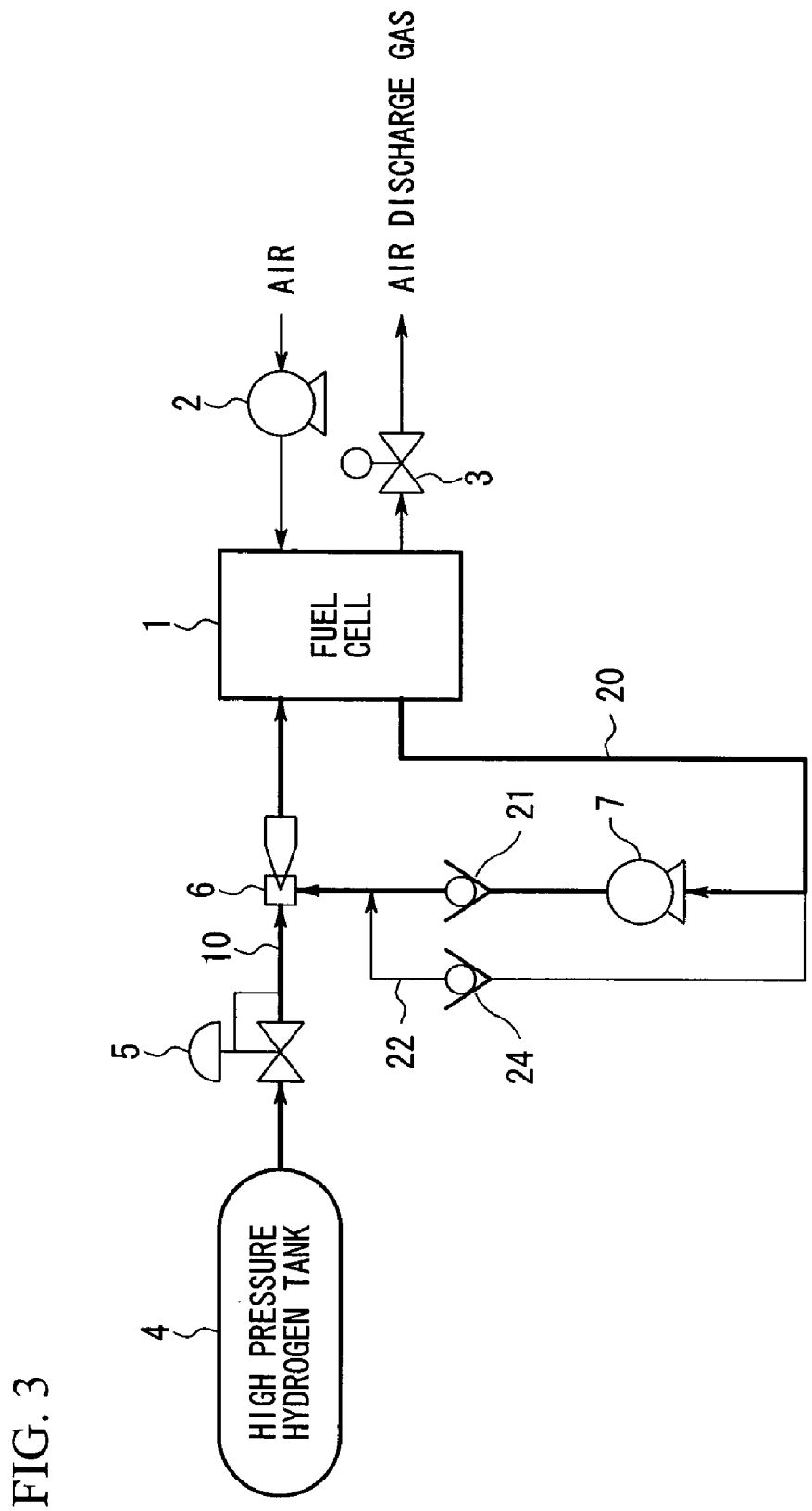
FIG. 3 is a schematic diagram of a third embodiment of a fuel cell system according to this invention.

Hereunder, embodiments of a fuel cell system according to the present invention will be described with reference to FIG. 1 through FIG. 3. Here, each of the embodiments described below is an aspect of a fuel cell system for installation in fuel cell vehicles.

First Embodiment

Initially, a first embodiment of a fuel cell system according to this invention will be described with reference to FIG. 1.

Figure 1:
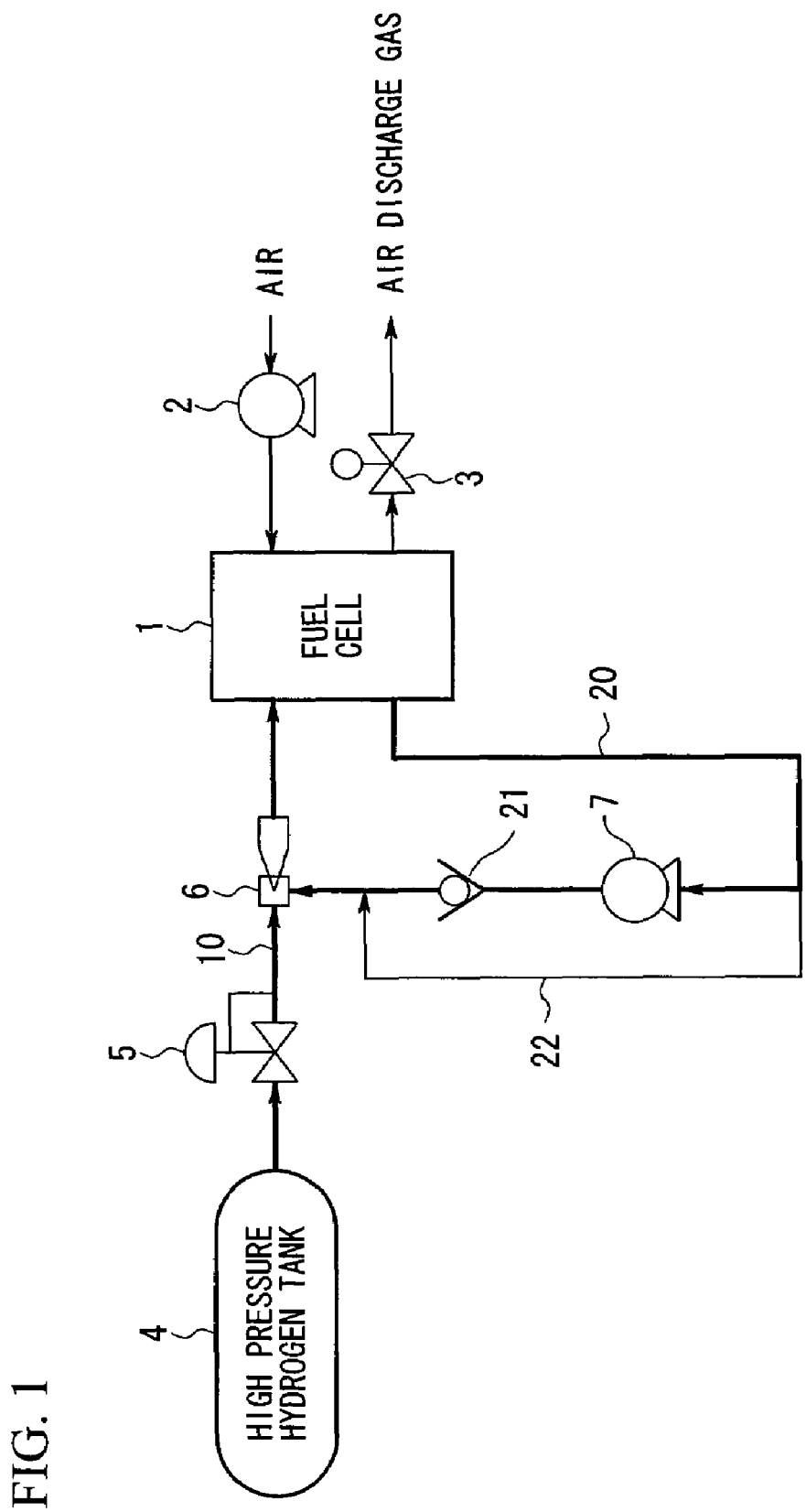
FIG. 1 is a schematic diagram of a first embodiment of a fuel cell system according to this invention.

FIG. 1 is a schematic block diagram of a fuel cell system according to the first embodiment.

A fuel cell 1 is made from a stack comprising multiple laminated cells, formed by inserting a solid polymer electrolyte membrane, made for example from a solid polymer ion exchange membrane, in between an anode and a cathode. When hydrogen gas is supplied to the anode as fuel, and air containing oxygen is supplied to the cathode as an oxidizing agent, the hydrogen ions generated by a catalytic reaction at the anode migrate to the cathode via the solid polymer electrolyte membrane, to generate power by causing an electrochemical reaction with the oxygen at the cathode, and water is produced. Furthermore, because part of the water produced on the cathode side diffuses back to the anode side via the solid polymer electrolyte membrane, there is also water produced on the anode side.

The air is raised to a predetermined pressure by a compressor 2, and supplied to the cathode of the fuel cell 1. After this air has been used to generate power, it is discharged from the cathode of the fuel cell 1 as air discharge gas, and discharged via a pressure control valve 3.

On the other hand, the hydrogen gas supplied from a high pressure hydrogen tank 4 passes along a hydrogen gas supply flow path 10 provided with a pressure control valve 5 and an ejector 6, and is supplied to the anode of the fuel cell 1 having been reduced to a predetermined pressure by the pressure control valve 5.

After the hydrogen gas supplied to the fuel cell 1 has been used to generate power, non-reacted hydrogen gas is discharged from the anode of the fuel cell 1 as hydrogen off gas by a hydrogen off gas circulation path 20. The hydrogen off gas circulation path 20 is connected to a suction side of the ejector 6, and a hydrogen pump 7 and a check valve 21 are provided partway along the hydrogen off gas circulation path 20. The hydrogen pump 7 raises the pressure of the hydrogen off gas discharged from the cathode of the fuel cell 1, so that this flows into the ejector 6 through the check valve 21. As a result, the hydrogen off gas is mixed with fresh hydrogen gas supplied from the high pressure hydrogen tank 4 so as to be supplied to the anode of the fuel cell 1 a second time.

Also, a hydrogen off gas bypass flow path 22 that bypasses the hydrogen pump 7 and the check valve 21 is connected to the hydrogen off gas circulation path 20.

In a fuel cell system constructed in this way, when the hydrogen pump 7 is driving normally, as described above, the hydrogen off gas discharged from the anode of the fuel cell 1 is raised in pressure by the hydrogen pump 7 partway along the hydrogen off gas circulation path 20, flows into the ejector 6 through the check valve 21, and is mixed with fresh hydrogen gas supplied from the high pressure hydrogen tank 4 so as to be supplied to the anode of the fuel cell 1 a second time via the hydrogen gas supply flow path 10. This is the circulation path of the hydrogen off gas when the hydrogen pump 7 is driving normally, and hereunder this path will be referred to as a "normal circulation path".

However, when the hydrogen pump 7 cannot drive due to freezing and the like, and when even if the hydrogen pump 7 is driving, the amount of hydrogen gas flowing by means of the normal circulation path is very low, the hydrogen off gas within the hydrogen off gas circulation path 20 in the vicinity of the ejector 6 is drawn in by the negative pressure created when the fresh hydrogen gas delivered from the high pressure hydrogen tank 4 flows through the ejector 6. As a result, the hydrogen off gas discharged from the anode of the fuel cell 1 into the hydrogen off gas circulation path 20 passes along the hydrogen off gas bypass flow path 22 and then passes along the hydrogen off gas circulation path 20 downstream from the check valve 21, and is drawn in to the ejector 6 and mixed with fresh hydrogen gas supplied from the high pressure hydrogen tank 4, so as to be supplied to the anode of the fuel cell 1 a second time through the hydrogen gas supply flow path 10. Hereunder this path will be referred to as an "abnormal circulation path". At this time, the ejector 6 feeds the hydrogen off gas from the hydrogen off gas bypass flow path 22 into the hydrogen gas supply flow path 6.

Accordingly, even when the hydrogen pump 7 is unable to drive due to freezing and there is a reduced amount of flow, or when the hydrogen pump 7 is malfunctioning due to reasons other than freezing, or when even if the hydrogen pump 7 is able to drive normally, the flow path in the vicinity of the check valve 21 and the hydrogen pump 7 is blocked, and so on, the hydrogen off gas can be reliably circulated at a predetermined flow rate. As a result, even in these kinds of situations, the hydrogen can be supplied to the fuel cell 1 in a stabilized condition, and the fuel cell system can be driven in a stabilized condition.

In particular, because the fuel cell system can be driven in a stabilized condition when starting up at low temperatures, the startup performance of the fuel cell vehicle is improved, thereby increasing convenience.

In this embodiment, the part of the hydrogen off gas circulation path 20 which connects the check valve 21 and the ejector 6 can be considered as part of the hydrogen off gas bypass flow path 22, because hydrogen off gas flows therethrough at abnormal times. Hence it can be said that the hydrogen off gas circulation path 20 and the hydrogen off gas bypass flow path 22 are connected to the suction side of the ejector 6. As a result, the construction of the flow path can be simplified, and the fuel cell system can be made small and lightweight.

However, depending on the flow path resistance of the hydrogen gas bypass flow path 22, when the hydrogen off gas is circulating through the normal circulation path, a part of the hydrogen off gas which the hydrogen pump 7 has raised in pressure passes through the hydrogen off gas bypass flow path 22 to return to the suction side of the hydrogen pump 7, without flowing towards the hydrogen gas supply flow path 10. When this happens, there is concern that it may become impossible to circulate the hydrogen off gas at the desired flow rate.

Accordingly, it is preferable to provide a reverse flow prevention device in the hydrogen off gas bypass flow path 22, which prevents the hydrogen off gas which the hydrogen pump 7 has raised in pressure at normal times from passing through the hydrogen off gas bypass flow path 22 to return to the suction side of the hydrogen pump 7.

The embodiments described hereunder have a reverse flow prevention device provided in the hydrogen off gas bypass flow path 22.

Second Embodiment

Next, a second embodiment of a fuel cell system according to this invention will be described with reference to FIG. 2. The only point in which the embodiment of the fuel cell system in FIG. 2 differs to that of the first embodiment is that an isolation valve 23 is provided in the hydrogen off gas bypass flow path 22 as a reverse flow prevention device.

Other construction is the same as the first embodiment, and hence similar parts are denoted by the same reference symbols, and description is omitted.

Opening and closing of the isolation valve 23 is controlled by an electrical control unit (ECU) 50.

It is possible to control the isolation valve 23 depending on the driving state of the hydrogen pump 7. As one example of control in such a situation, the rotation speed of the hydrogen pump 7 is detected by a pump rotation speed sensor 51, and when the detected pump rotation speed exceeds a predetermined rotation speed N, it is determined that the hydrogen pump 7 is driving normally, and the isolation valve 23 is controlled to a closed state, while when the pump rotation speed is less than the predetermined rotation speed N, it is determined that the hydrogen pump 7 is malfunctioning, and the isolation valve 23 is controlled to an open state.

When the isolation valve 23 is controlled in this way, if the hydrogen pump 7 is driving normally, the isolation valve 23 can be closed, so that the hydrogen off gas can be prevented from flowing along the hydrogen off gas bypass flow path 22, and the full amount of hydrogen off gas can be circulated by the hydrogen pump 7. Also, when the drive of the hydrogen pump 7 is malfunctioning (including being disabled) the isolation valve 23 can be opened, so that the hydrogen off gas can be circulated via the hydrogen off gas bypass flow path 22 and the ejector 6.

Accordingly, it becomes possible for the hydrogen to be again stabilized and supplied to the fuel cell 1, so that the fuel cell system is again stabilized to enable driving.

Furthermore, it is also possible to control the isolation valve 23 depending on the outside air temperature. As one example of control in such a situation, when the outside air temperature detected by an outside air temperature sensor 52 exceeds a predetermined temperature T, it is determined that the hydrogen pump 7 is driving normally without the hydrogen pump 7 freezing, and the isolation valve 23 is controlled to a closed state, while when the outside air temperature is lower than the predetermined temperature T, it is determined that there is a likelihood that the hydrogen pump 7 is freezing, and the isolation valve 23 is controlled to an open state.

When the isolation valve 23 is controlled in this way, if there is no likelihood that the hydrogen pump 7 is freezing due to the outside air temperature exceeding the predetermined temperature, the isolation valve 23 can be closed, so that the hydrogen off gas can be prevented from flowing along the hydrogen off gas bypass flow path 22, and the full amount of hydrogen off gas can be circulated by the hydrogen pump 7. Also, when there is concern that the hydrogen pump 7 is freezing due to the outside air temperature being lower than the predetermined temperature, the isolation valve 23 can be opened, so that the hydrogen off gas can be circulated via the hydrogen off gas bypass flow path 22 and the ejector 6.

Accordingly, it becomes possible for the hydrogen to be again stabilized and supplied to the fuel cell 1, and the fuel cell system is again stabilized to enable driving. This embodiment particularly improves the startup performance of the fuel cell system at low temperatures.

Also, in the second embodiment, because the hydrogen off gas bypass flow path 22 is provided so as to bypass the check valve 21, when the hydrogen off gas flows through the circulation path at abnormal times, it can flow into the ejector 6 without passing through the check valve 21. As a result, the pressure drop on the suction side of the ejector 6 can be reduced enabling an increase in the amount of hydrogen off gas being circulated.

Third Embodiment

Next, a third embodiment of a fuel cell system according to this invention will be described with reference to FIG. 3. The only point in which the third embodiment of the fuel cell system differs to that of the first embodiment is that a check valve 24 is provided in the hydrogen off gas bypass flow path 22 as a reverse flow prevention device. For this check valve 24 it is possible to use various types of valves such as a reed valve or a poppet valve.

Other construction is the same as the first embodiment, and hence similar parts are denoted by the same reference symbols, and description is omitted.

This check valve 24 allows the hydrogen off gas to flow along the hydrogen off gas bypass flow path 22, from the hydrogen off gas circulation path 20 downstream from the hydrogen pump 7 to the hydrogen off gas circulation path 20 upstream from the check valve 21, and prevents the hydrogen off gas from flowing along the hydrogen off gas bypass flow path 22 in the reverse direction thereof. In other words, the check valve 24 allows the hydrogen off gas to flow along the hydrogen off gas bypass flow path 22 in a direction flowing into the ejector 6, and prevents flow in the reverse direction thereof.

When the check valve 24 is provided in the hydrogen off gas bypass flow path 22 in this way, because the check valve 24 opens and closes by mechanically sensing an increase in pathway obstruction and suction resistance, there is no electric control as in the second embodiment, and when the hydrogen pump 7 is driving normally, the check valve 24 is able to prevent the hydrogen off gas from flowing in reverse along the hydrogen off gas bypass flow path 22, so that the full amount of hydrogen off gas can be circulated by the hydrogen pump 7. Also, when the amount of hydrogen off gas circulating through the circulation path at normal times is insufficient due to drive malfunction of the hydrogen pump 7 (including being disabled), the hydrogen off gas can be circulated via the hydrogen off gas bypass flow path 22, the check valve 24, and the ejector 6.

Accordingly, it becomes possible for the hydrogen to be again stabilized and supplied to the fuel cell 1, and the fuel cell system is again stabilized to enable driving. Also, electric control becomes unnecessary, enabling the construction of the fuel cell system to be simplified.

Moreover in the third embodiment, in the same way as in the second embodiment, because the hydrogen off gas bypass flow path 22 is provided so as to bypass the check valve 21, the pressure drop on the suction side of the ejector 6 can be reduced, and the amount of hydrogen off gas being circulated can be increased.

The case in which the check valve 24 freezes is also considered. However because the downstream side of the check valve 24 is connected to the suction side of the ejector 6, a negative pressure is created on the downstream side of the check valve 24. As a result a differential pressure is created on the front and rear of the check valve 24, and due to this differential pressure the adhesion caused by freezing of the check valve 24 can be released.

Other Embodiments

This invention is not limited to the above embodiments.

For example, in each of the above embodiments, in order to simplify the flow path construction and so on, the hydrogen off gas bypass flow path 22 is connected to the suction side of the ejector 6 by merging with the hydrogen off gas circulation path 20, but it is also possible to connect just the hydrogen off gas bypass flow path 22 to the suction side of the ejector 6, and to connect the hydrogen off gas circulation path 20 to the hydrogen gas supply flow path 10 further downstream from the ejector 6. In this case, it is preferable to provide an electric control type isolation valve in the hydrogen off gas bypass flow path 22 in the same way as in the second embodiment, so that the hydrogen off gas does not flow along the hydrogen off gas bypass flow path 22 at normal times.

As described above, according to the first aspect of the invention, when the hydrogen pump is driving normally, the hydrogen off gas can be returned to the hydrogen gas supply flow path via the hydrogen off gas circulation path, and when the amount of circulating hydrogen off gas flowing through the hydrogen off gas circulation path is insufficient due to malfunctioning and so on of the hydrogen pump, the hydrogen off gas can be returned to the hydrogen gas supply flow path via the hydrogen off gas bypass flow path, by the ejector, and the hydrogen off gas can be reliably circulated. Accordingly, when the hydrogen pump is disabled or malfunctioning, it becomes possible for the hydrogen to be stabilized and supplied to the fuel cell, so that the superior effect of the drive of the fuel cell system being stabilized can be demonstrated.

According to the second aspect of the invention, when the hydrogen pump is driving normally, the hydrogen off gas which has been raised in pressure by the hydrogen pump can be prevented from flowing through the hydrogen off gas bypass flow path, and the full amount of hydrogen off gas can be circulated, so that there is the effect that the fuel cell can be driven stabilized to a desired output.

According to the third aspect of the invention, it becomes possible to simplify the flow path construction, and there is the effect that a reduction in the size and weight of the fuel cell system can be achieved.

According to the fourth aspect of the invention, by controlling the isolation valve to a closed state when the hydrogen pump is being driven normally, the hydrogen off gas is prevented from flowing through the hydrogen off gas bypass flow path, with the effect that the full amount of hydrogen off gas can be circulated by the hydrogen pump, and by controlling the isolation valve to an open state when the hydrogen pump is malfunctioning or disabled, there is the effect that the hydrogen off gas can be circulated via the hydrogen off gas bypass flow path and the ejector.

According to the fifth aspect of the invention, by determining that the hydrogen pump is driving normally when the rotation speed of the hydrogen pump exceeds the predetermined rotation speed, and controlling the isolation valve to a closed state, the hydrogen off gas is prevented from flowing through the hydrogen off gas bypass flow path, with the effect that the full amount of hydrogen off gas can be circulated by the hydrogen pump. Also, by determining that the hydrogen pump is malfunctioning or disabled when the rotation speed of the hydrogen pump is lower than the predetermined rotation speed, and controlling the isolation valve to an open state, there is the effect that the hydrogen off gas can be circulated via the hydrogen off gas bypass flow path and the ejector.

According to the sixth aspect of the invention, because there is no concern that the hydrogen pump is freezing when the outside air temperature exceeds the predetermined temperature, by controlling the isolation valve to a closed state at this time, the hydrogen off gas is prevented from flowing through the hydrogen off gas bypass flow path, thus enabling the full amount of hydrogen off gas to be circulated by the hydrogen pump. Also, because there is concern that the hydrogen pump may freeze when the outside air temperature is lower than the predetermined temperature, by controlling the isolation valve to an open state at this time, the hydrogen off gas can be circulated via the hydrogen off gas bypass flow path and the ejector. As a result, even when the hydrogen pump is malfunctioning or disabled due to freezing, hydrogen can be stabilized and supplied to the fuel cell, and there is the effect that the startup performance of the fuel cell system at low temperatures is improved and stabilized.

According to the seventh aspect of the invention, because the check valve opens and closes by mechanically sensing an increase in the pathway obstruction and suction resistance, when the hydrogen pump is being driven normally, with no electric control, the hydrogen off gas is prevented from flowing through the hydrogen off gas bypass flow path, enabling the full amount of hydrogen off gas to be circulated by the hydrogen pump. Moreover, when the amount of circulating hydrogen off gas flowing through the hydrogen off gas circulation path due to the hydrogen pump malfunctioning (including being disabled) is insufficient, the hydrogen off gas can be circulated via the hydrogen off gas bypass flow path and the ejector. Therefore there is the effect that construction of the fuel cell system can be simplified.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. A fuel cell system comprising:
    a fuel cell which generates electric power based on hydrogen and a oxidant gas supplied from the outside thereof;
    a hydrogen gas supply flow path for supplying the hydrogen to the fuel cell;
    a hydrogen off-gas circulating passage for returning hydrogen off-gas from said fuel cell to said hydrogen gas supply flow path;
    a hydrogen pump for boosting the hydrogen off-gas mounted in said hydrogen off-gas circulating passage;
    a hydrogen off-gas bypass passage which bypasses the hydrogen pump to return the hydrogen off-gas to said hydrogen gas supply flow path; and
    an ejector for sending the hydrogen off-gas in the hydrogen off-gas bypass passage to the hydrogen gas supply flow path, wherein
    a back flow check device is provided at said hydrogen off-gas bypass passage for checking back flow of the hydrogen off-gas, and wherein
    said back flow check device is an isolation valve, which is controlled in response to the driving state of said hydrogen pump.

2. The fuel cell system according to claim 1, wherein said hydrogen off-gas circulating passage and said hydrogen off-gas bypass passage are connected to an intake side of the ejector.

3. The fuel cell system according to claim 1, wherein said isolation valve is controlled so that it is closed when a rotation speed of said hydrogen pump exceeds a predetermined rotation speed, and is controlled so that it is opened when the rotation speed of said hydrogen pump falls below a predetermined rotation speed.

4. A fuel cell system comprising:
    a fuel cell which generates electric power based on hydrogen and an oxidant gas supplied from the outside thereof;
    a hydrogen gas supply flow path for supplying hydrogen to the fuel cell;
    a hydrogen off-gas circulating passage for returning hydrogen off-gas from said fuel cell to said hydrogen gas supply flow path;
    a hydrogen pump for boosting the hydrogen off-gas, mounted in said hydrogen off-gas circulating passage;
    a hydrogen off-gas bypass passage which bypasses the hydrogen pump to return the hydrogen off-gas to said hydrogen gas supply flow path; and
    an ejector for sending the hydrogen off-gas in the hydrogen off-gas bypass passage to the hydrogen gas supply flow path, wherein
    a back flow check device is provided at said hydrogen off-gas bypass passage for checking back flow of the hydrogen off-gas, and wherein
    said back flow check device is an isolation valve, which is controlled to be in a closed state when an outside temperature is above a predetermined temperature and which is controlled to be in an open state when the outside temperature is below a predetermine temperature.

5. The fuel cell system according to claim 4, wherein said hydrogen off-gas circulating passage and said hydrogen off-gas bypass passage are connected to an intake side of the ejector.

* * * * *